United States Patent
Schmitt et al.

(10) Patent No.: US 12,332,613 B2
(45) Date of Patent: Jun. 17, 2025

(54) DEVICE AND METHOD FOR TRAINING A CONTROL STRATEGY FOR A CONTROL DEVICE OVER SEVERAL ITERATIONS

(71) Applicant: Robert Bosch GmbH, Stuttgart (DE)

(72) Inventors: Felix Schmitt, Ludwigsburg (DE); Johannes Maximilian Doellinger, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1080 days.

(21) Appl. No.: 17/191,091

(22) Filed: Mar. 3, 2021

(65) Prior Publication Data
US 2021/0341885 A1 Nov. 4, 2021

(30) Foreign Application Priority Data
Apr. 30, 2020 (DE) .......................... 102020205532.7

(51) Int. Cl.
  *G05B 13/02* (2006.01)
  *G05B 13/04* (2006.01)
  *G05D 1/00* (2024.01)
  *G06N 3/08* (2023.01)
(52) U.S. Cl.
  CPC ......... *G05B 13/027* (2013.01); *G05B 13/042* (2013.01); *G05D 1/0221* (2013.01); *G06N 3/08* (2013.01)
(58) Field of Classification Search
  CPC .... G05B 13/027; G05B 13/042; G05B 17/02; G05D 1/0221; G06N 3/08; G06N 3/006; G06F 11/3688
  See application file for complete search history.

(56) References Cited

U.S. PATENT DOCUMENTS

2019/0266489 A1\* 8/2019 Hu ........................ B60W 10/20
2019/0310650 A1\* 10/2019 Halder ................. G05D 1/0221

OTHER PUBLICATIONS

Wang J, Zhang Q, Zhao D, Chen Y. Lane change decision-making through deep reinforcement learning with rule-based constraints. In2019 International Joint Conference on Neural Networks (IJCNN) Jul. 14, 2019 (pp. 1-6). IEEE. (Year: 2019).\*
Saunders W, Sastry G, Stuhlmüller A, Evans O. Trial without Error: Towards Safe Reinforcement Learning via Human Intervention. Space. 1(1.4):1-6. AAMAS 2018, Jul. 10-15, 2018. (Year: 2018).\*

(Continued)

*Primary Examiner* — Eunhee Kim
(74) *Attorney, Agent, or Firm* — NORTON ROSE FULBRIGHT US LLP

(57) ABSTRACT

A method of training a control strategy for a control. An exploration strategy for a current version of the control strategy is determined in each of several iterations. Several simulation runs are carried out, in each of which an action is selected in accordance with the exploration strategy, and it being checked if the selected action is safe, until a safe action has been selected or a maximum number of actions greater than or equal to two has been selected. A follow-up state of the state in the sequence of states is ascertained. The sequence of states are collected as data of the simulation run; for the iteration. The value of a loss function is ascertained over the data of the executed simulation runs and the control strategy is adapted so that the value of the loss function is reduced.

13 Claims, 4 Drawing Sheets

(56) References Cited

OTHER PUBLICATIONS

Wang P, Chan CY, Li H. Automated driving maneuvers under interactive environment based on deep reinforcement learning. arXiv preprint arXiv:1803.09200. Mar. 25, 2018. (Year: 2015).*

Nageshrao S, Tseng HE, Filev D. Autonomous highway driving using deep reinforcement learning. In2019 IEEE International Conference on Systems, Man and Cybernetics (SMC) Oct. 6, 2019 (pp. 2326-2331). IEEE. (Year: 2019).*

Bouton M, Karlsson J, Nakhaei A, Fujimura K, Kochenderfer MJ, Tumova J. Reinforcement learning with probabilistic guarantees for autonomous driving. arXiv preprint arXiv:1904.07189. Apr. 15, 2019. (Year: 2019).*

Leiditz Thorsson, Jonathan, and Olof Steinert. "Neural networks for collision avoidance—Preliminary investigations of training neural networks using deep Q-learning and genetic algorithms for active safety functions.". 2016. 76 Pages. (Year: 2016).*

Chen S, Wang M, Song W, Yang Y, Li Y, Fu M. Stabilization approaches for reinforcement learning-based end-to-end autonomous driving. IEEE Transactions on Vehicular Technology. Mar. 9, 2020;69(5):4740-50 . . . (Year: 2020).*

Nageshrao, Subramanya, et al., "Autonomous Highway Driving Using Deep Reinforcement Learning," 2019 IEEE International Conference on Systems, Man and Cybernetics (SMC), 2019, pp. 2326-2331.

Dalal, Gal, et al., "Safe Exploration in Continuous Action Spaces," Cornell University, 2018, pp. 1-9. <https://arxiv.org/pdf/1801.08757.pdf> Downloaded Mar. 2, 2021.

Zhang, Songan, et al., "Discretionary Lane Change Decision Making Using Reinforcement Learning With Model-Based Exploration," 18th IEEE International Conference on Machine Learning and Applications (ICMLA), 2019, pp. 844-850.

* cited by examiner

DEVICE AND METHOD FOR TRAINING A CONTROL STRATEGY FOR A CONTROL DEVICE OVER SEVERAL ITERATIONS

CROSS REFERENCE

The present application claims the benefit under 35 U.S.C. § 119 of German Patent Application No. DE 102020205532.7 filed on Apr. 30, 2020, which is expressly incorporated herein by reference in its entirety.

FIELD

Different exemplary embodiments of the present invention relate generally to a device and a method of training a control strategy for a control device, in particular, a robot control device.

BACKGROUND INFORMATION

In recent years, autonomous driving has become a subject of great interest both in research and in public. Autonomous vehicles (AV's) have an enormous potential not only economically, but also for improving mobility options and for potentially reducing carbon emissions. Autonomous driving includes decision-making, as in the case of the control system in any robotic system. A typical implementation of decision-making in autonomous driving takes place through the solution of a series of path-planning problems. They are formulated as a series of optimization problems, in which particular boundary conditions apply. A solution (e.g., having the lowest costs) is then selected for the control system. This approach is computationally intensive and may also produce uncomfortable vehicle movements.

Another approach is reinforced or strengthened learning (also referred to as reinforcement learning (RL)). In RL, a control strategy is adapted on the basis of rewards, which are received for control actions and/or the states attained in this context. The training is episodic. In each of multiple simulation runs (which are referred to as roll-outs), a control system interacts with the surrounding area (that is, with a traffic scenario) for a certain time, by selecting control actions in accordance with the current control strategy, and adapts the control strategy, in order to maximize the expected rewards.

However, in autonomous driving (and also other control scenarios), actions, which are not implementable, may appear. For example, a lane change is not implementable, when the target lane is not free.

In the case of a non-implementable action, one approach for solving this problem is to add a penalty (very low and negative reward) to the actual reward and to interrupt the simulation run early. A disadvantage of this approach is that in RL applications having complex subsets of implementable actions at the start of the training method, penalties are almost exclusively received from the environment, since the strategy has not yet learned the actions, which are actually implementable. However, due to the marked predominance of the penalties for non-implementable actions, it is particularly difficult for the strategy to make any learning progress at all. Consequently, a high number of, and possibly, excessively many, roll-outs are needed, in order to learn a strategy that obtains a high reward.

In the paper by Nageshrao, Subramanya, Eric Tseng, and Dimitar Filev, "Autonomous Highway Driving using Deep Reinforcement Learning," arXiv preprint arXiv: 1904.00035 (2019): https://arxiv.org/pdf/1904.00035 (hereinafter, reference [1]), it is proposed that a non-implementable action in training be treated as a collision, that is, responded to with a high penalty, and that the roll-out be viewed as terminated. However, the simulation is not terminated and, instead, continued, using a safe action. In this manner, at least half of the training data (corresponding to the safe action) normally contain implementable actions. However, in training, the roll-outs are interrupted after a single non-implementable action. After the action corrected to the safe action, the information about the contribution of previous actions to rewards is lost.

Dalai, Gal, et al., "Safe exploration in continuous action spaces," arXiv preprint arXiv: 1801.08757 (2018): https://arxiv.org/pdf/1801.08757 (hereinafter, reference [2]), suggests an approach for the case, in which inadmissible actions are defined by the subsequent exceedance of a threshold value regarding a measurable and continuous target variable. To this end, a model is evaluated, which, starting from the current state and an action to be checked, predicts the target variable. The model of the strategy is finally expanded by a layer, so that the model attempts to prevent the selection of impermissible actions. In this context, it is necessary for the model of the target variable to be linear in the action to be checked, which is often not the case with complex interrelationships in applications in autonomous driving.

Approaches for training control systems, e.g., for robots (in particular, of vehicles), in which the limitations of the above-mentioned approaches for the case of non-implementable actions are prevented and, in particular, effective learning progress may be achieved, are desirable.

SUMMARY

During the training of the current control strategy, a method in accordance with an example embodiment of the present invention allows several attempts to be carried out to find a safe action (that is, e.g., one implementable at not an overly high risk). In particular, simulation runs (roll-outs) are not interrupted already after the first non-implementable action. In this manner, the contribution of early actions to rewards at the end of the roll-out may be taken into account. This enables effective learning progress. An action, which is safe in every situation, is not absolutely necessary. However, the method according to in accordance with an example embodiment of the present invention may utilize a safe action, in order to improve the training further.

A continuous target variable and a threshold value (for the target variable) are not needed for the training method according to an example embodiment of the present invention. It is sufficient for an action to be evaluated by an oracle as implementable or non-implementable. In comparison with the standard RL, there are no additional model limitations.

Exemplary embodiments of the present invention are described below.

Exemplary embodiment 1 in accordance with the present invention is a method of training a control strategy for a control device over several iterations; an exploration strategy for a current version of the control strategy being determined in each iteration; several simulation runs being carried out; for each simulation run, for each state of a sequence of states beginning with an initial state of the simulation run, an action being selected in accordance with the exploration strategy, and it being checked if the selected action is safe, until a safe action has been selected or a maximum number of actions greater than or equal to two has been selected; the follow-up state of the state in the sequence of states being ascertained by simulation during execution of the selected action, if a safe action has been selected, or, if no safe action has been selected up to the reaching of the maximum number in accordance with the strategy, the simulation run being interrupted, or a specified, safe action being selected, if one is available; and during execution of the selected, specified, safe action, the follow-up state of the state in the sequence of states being ascertained by simulation; the sequence of states, including the selected actions and rewards received in the states, being collected as data of the simulation run; for the iteration, the value of a loss function being ascertained over the data of the executed simulation runs, and the control strategy being adapted for a new version, so that the value of the loss function is reduced.

Exemplary embodiment 2 in accordance with the present invention is a method according to exemplary embodiment 1; the loss function including an auxiliary term, which is a function of the data of the executed simulation runs, and which penalizes the selection of unsafe actions in the simulation runs.

Consequently, it may be ensured that the training does have the option of selecting freely from possible actions, but that on the other hand, the strategy is trained in such a manner, that safe actions are preferred.

Exemplary embodiment 3 in accordance with the present invention is a method according to exemplary embodiment 2; the auxiliary term being weighted; and beginning with a starting weight, the weighting being reduced in the course of the iterations.

By reducing the weighting parameter in the course of the training, it is ensured that the additional target function (that is, the auxiliary term,) does not have a disruptive effect on the optimization of the actual target function. In general, an adaptive selection of the weighting parameter may be provided, which prevents too much weight from being placed on the prevention of non-implementable actions at the expense of the other terms of the (overall) target function.

Exemplary embodiment 4 in accordance with the present invention is a method according to one of exemplary embodiments 1 through 3; the control strategy being given by a neural network, and the adaptation of the control strategy including the adaptation of weightings of the neural network.

The use of a neural network for representing the strategy allows efficient training, using efficient, highly developed methods for adjusting weighting through gradient descent.

Exemplary embodiment 5 in accordance with the present invention is a method according to one of exemplary embodiments 1 through 4; the simulation run being ended, when the sequence of states reaches a maximum length, or when a control target is reached in the ascertained follow-up state.

Thus, the training method may ascertain a chain of safe actions, e.g., up to a final reward.

Exemplary embodiment 6 in accordance with the present invention is a method according to one of exemplary embodiments 1 through 5; the loss function being a loss function for an actor-critic RL method or a deep Q-learning method.

In particular, a current, tried and tested RL method may be taken as a basis for the training method, and its loss function, possibly supplemented by one or more additional terms, may be used as a loss function of the training method.

Exemplary embodiment 7 in accordance with the present invention is a method according to one of exemplary embodiments 1 through 6; beginning with an initial value, the maximum number being reduced in the course of the iterations.

An arbitrary upper limit (that is, maximum number) of actions selected one after another by the strategy may be established. During the training, the upper limit may be adapted to the degree of exploration.

Exemplary embodiment 8 in accordance with the present invention is a device, which is configured to execute the method according to one of exemplary embodiments 1 through 7.

Exemplary embodiment 9 in accordance with the present invention is a control method, including controlling a software or hardware agent based on the control strategy trained according to one of exemplary embodiments 1 through 7.

Exemplary embodiment 10 in accordance with the present invention is a software or hardware agent, in particular, a robot, including a sensor, which is configured to provide sensor data; and a control device, which is configured to control components of the software or hardware agent based on the control strategy trained according to one of exemplary embodiments 1 through 7.

Exemplary embodiment 11 in accordance with the present invention is a software or hardware agent according to exemplary embodiment 10, including at least one actuator; the control device being configured to control the at least one actuator in accordance with the control strategy trained according to one of exemplary embodiments 1 through 7.

Exemplary embodiment 12 in accordance with the present invention is a computer program, including program instructions, which, when they are executed by one or more processors, cause the one or more processors to carry out a method according to one of exemplary embodiments 1 through 7 or 9.

Exemplary embodiment 13 in accordance with the present invention is a computer-readable storage medium, in which program instructions are stored, which, when they are executed by one or more processors, cause the one or more processors to carry out a method according to one of exemplary embodiments 1 through 7 or 9.

Exemplary embodiments of the present invention are depicted in the figures and are explained in greater detail in the following. In the figures, identical reference characters generally relate to the same parts everywhere in the various views. The figures are not necessarily true to scale; instead, the emphasis being generally on the representation of the principles of the present invention.

DETAILED DESCRIPTION OF EXAMPLE EMBODIMENTS

The different specific embodiments, in particular, the exemplary embodiments of the present invention described below, may be implemented with the aid of one or more circuits. In one specific embodiment, a "circuit" may be understood as any type of logic-implementing entity, which may be hardware, software, firmware or a combination of them. Thus, in one specific embodiment, a "circuit" may be a hardwired logic circuit or a programmable logic circuit, such as a programmable processor, for example, a microprocessor. A "circuit" may also be software, for example, any type of computer program, which may be implemented and/or executed by a processor. Any other manner of implementing the specific functions, which are described in more detail in the following, may be understood as a "circuit" in accordance with an alternative specific embodiment.

Figure 1:
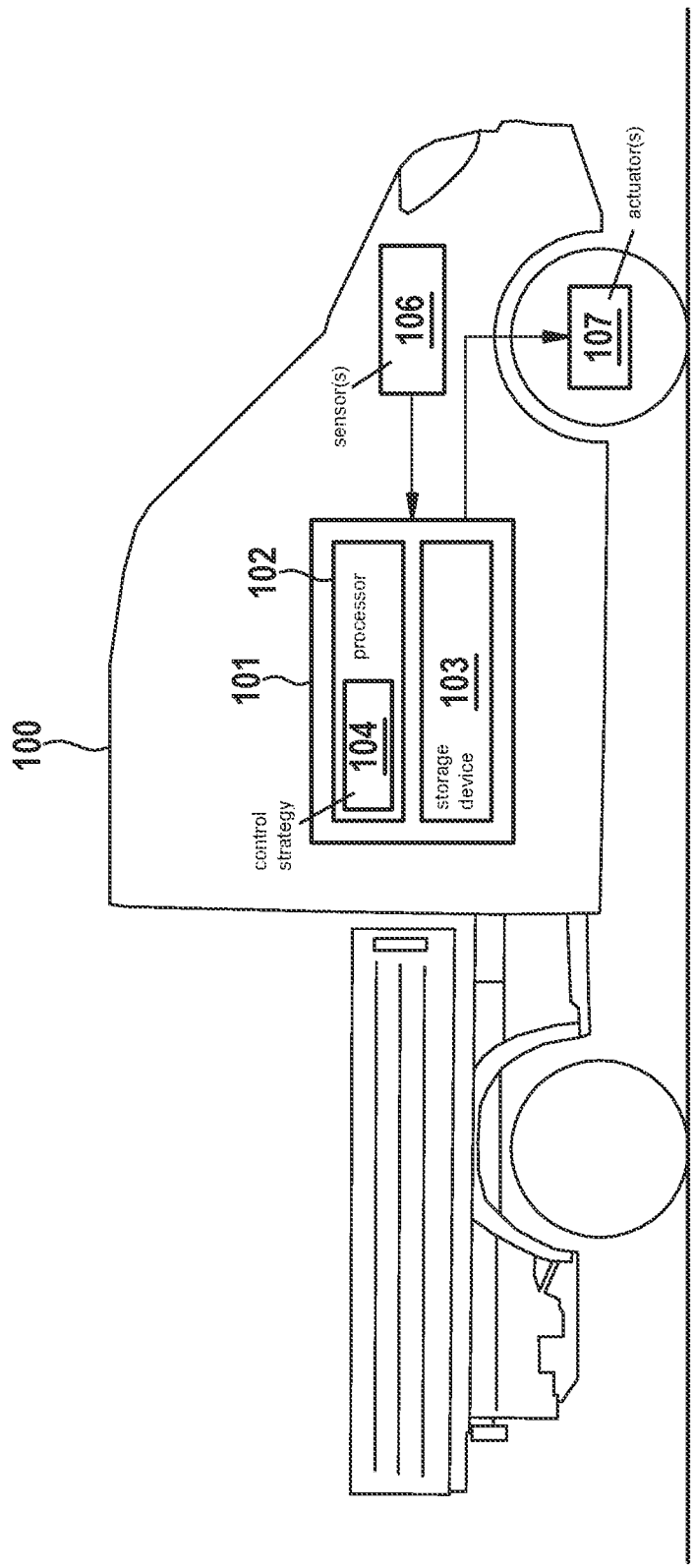
FIG. 1 shows an example of an autonomous vehicle 100, in accordance with the present invention.

FIG. 1 shows an example of an autonomous vehicle 100.

Vehicle 100, e.g., an automobile, a pick-up truck or a motorcycle, is equipped with a vehicle control device 101.

Vehicle control device 101 includes data processing components, such as a processor (e.g., a CPU (central processing unit)) 102 and a storage device 103 for storing the control software and the data, which processor 102 processes.

The control software includes, e.g., commands, which, when they are executed by processor 103, cause the processor, in response to sensor data that are provided by one or more sensors 106, to select control actions in accordance with a control strategy 104 and to control actuators 107 (brake, steering wheel, gas, . . . ) accordingly. Control strategy 104 may be stored, for example, in the form of a trained neural network, in vehicle 100, as part of the control software.

A control strategy 104 for vehicle 100 may be generated, in that it, e.g., a corresponding neural network, is trained by reinforcement learning (that is, reinforced or strengthened learning) in simulations.

In reinforcement learning, a strategy Π(a|s) is trained, which maps states s from a state space s', in the form of an input variable, to actions a from an action space A, in the form of an output variable.

During the training, the strategy, or an exploration strategy derived from it by modification, interacts with the (simulated) surrounding area and receives rewards r. The strategy is adapted on the basis of these rewards. The training is episodic. In simulation runs, so-called roll-outs, the strategy interacts with the surrounding area for a certain time (by executing an action a in a state s, which results in a new state s' in the next discrete time step), e.g., until a time limit is reached or a target state has been attained. Initial states $s_0$ are selected for these roll-outs.

In many practical applications, only a subset A'(s) of state space A is implementable as a function of current state s.

Figure 2:
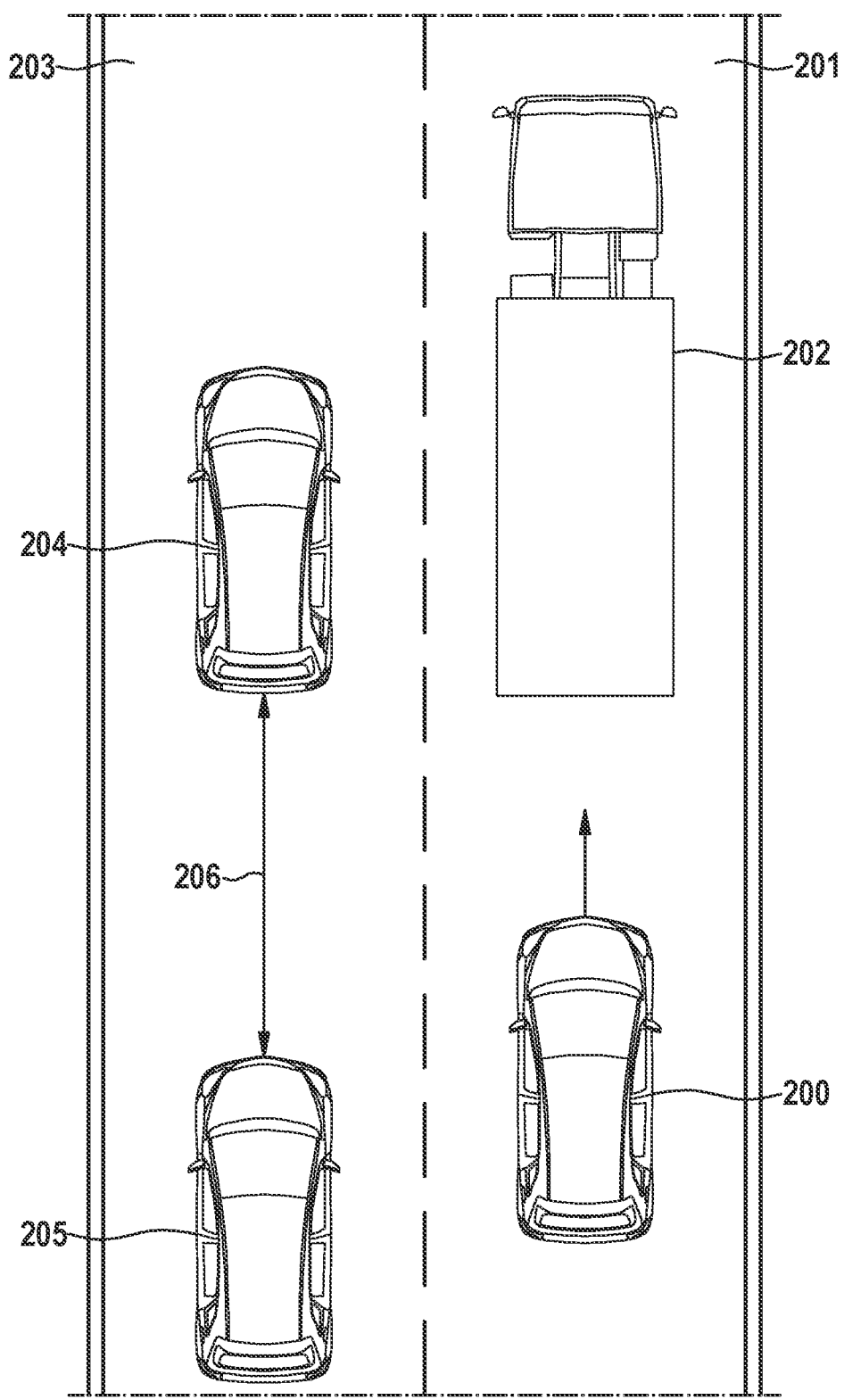
FIG. 2 shows an example of a traffic scenario.

As an example, the learning of the most rapid passing strategy of an autonomous vehicle is considered, as is represented in FIG. 2. In this context, state s is a representation of the road and the other vehicles, the action space is made up of the actions "lane change to the left," "lane change to the right," and "no lane change," and reward r is −1 for each state, for which the passing operation has not yet been completed.

FIG. 2 shows an example of a traffic scenario.

A vehicle 200, which corresponds, for example, to vehicle 100, is traveling in right lane 201 of a road (e.g., a two-lane freeway). A slow vehicle 202, such as a cargo truck, is located in front of vehicle 100. A possible control action would be to switch to left lane 203. However, further vehicles 204, 205 may already be using this lane.

Here, the action a="lane change to the left" may only be carried out, if gap 206 between the further vehicles in the left lane is sufficiently large:

Size of gap 206 in the left lane>length of vehicle 200

However, subset A'(s) of the implementable actions is often not known in advance and has a complex structure: In the case of a lane change, it is not known in advance, how large the gap on the left side must be, in order that in the case of squeezing into the gap, trailing vehicle 205 may adjust its speed sufficiently. Thus, the minimum size of gap 206 may well be considerably greater than the length of vehicle 200.

A so-called oracle Os(a) may be provided, which determines if a selected action is implementable: Os(a)=1⇔a is an element of A'(s), Os(a)=0⇔a is not an element of A'(s). The oracle may be defined by the user with the aid of domain knowledge of, e.g., traffic rules, vehicle dynamics, and system limitations. It may be learned from data or determined by the simulation environment.

In the above-described approach from reference [1] for dealing with non-implementable actions, the roll-outs in training continue to be interrupted after a single non-implementable action. After the action that is corrected to the safe action, the information about the contribution of previous actions to rewards is lost. This is the case, for example, if the driving task is the achievement of a particular objective, for which a reward is given out only upon fulfillment. In addition, this approach always requires a safe action that is executable, which is an unrealistic assumption for use of RL in automated driving. Even in reference lane 201, keeping at a constant speed is not possible, for example, in the case of abrupt, sharp deceleration of front vehicle 202. Finally, the constraint, that the current strategy has only one attempt to select an implementable action, is an obstacle, since especially at the start of the RL training method, strategies typically select from the set of actions in a targeted, but broad manner, in order to explore different options. Therefore, according to different specific embodiments, such as those described below, several attempts are allowed, since this is helpful for progress in learning.

A measurable and continuous target variable and a corresponding threshold value are necessary for the above-described approach from reference [2]. In addition, the target variable must be a linear function of the selected action, which is often not the case in complex interrelationships in applications in autonomous driving. For example, the distance from a vehicle 205 in adjacent lane 203 is a nonlinear function of the selected steering angle and the speed of vehicle 200.

In reinforcement learning, the strategy is improved in the individual training interations, using data D ascertained during roll-outs in the simulation. In this context, data set D={(s, a, r, s')} is made up of tuples of state s, action a, reward r and subsequent state s' in the simulation. The improvement is generally accomplished via the reduction in the value of a method-specific loss function L(Π,D), by changing strategy Π(a|s); the value of the loss function being a function of data D. If the strategy is implemented by a parametric model, such as a neural network, having parameter θ, that is, a strategy including a strategy $Π_θ(a|s)$ parameterized by θ, then the reduction takes place, for example, by gradient descent with regard to θ of loss function $L(Π_θ, D)$.

Examples of loss function L(Π(a|s), D) include
1. $-\Sigma_{(s, a, ., .) \in D}$ ADV(s, a, D)log($π_θ$(a|s)), for an actor-critic RL method; ADV(s, a, D) being an advantage estimator
2. $\Sigma_{(s, a, r, s') \in D}$ l($γ^*\max_a Q_θ$(s', a')+r−$Q_θ$(s, a)), for a deep Q-learning RL method; l( ) being a scalar-valued loss function, which takes on a minimum for the argument 0, $Q_θ$(s, a) being a parametric model, e.g., neural network, $Q_{\theta'}(s', a')$ being a copy of $Q_\theta(s, a)$, and the strategy being defined as $\Pi_\theta(a|s)=1$, if $a=\text{argmax}_a Q_\theta(s, a')$, otherwise 0

Figure 3:
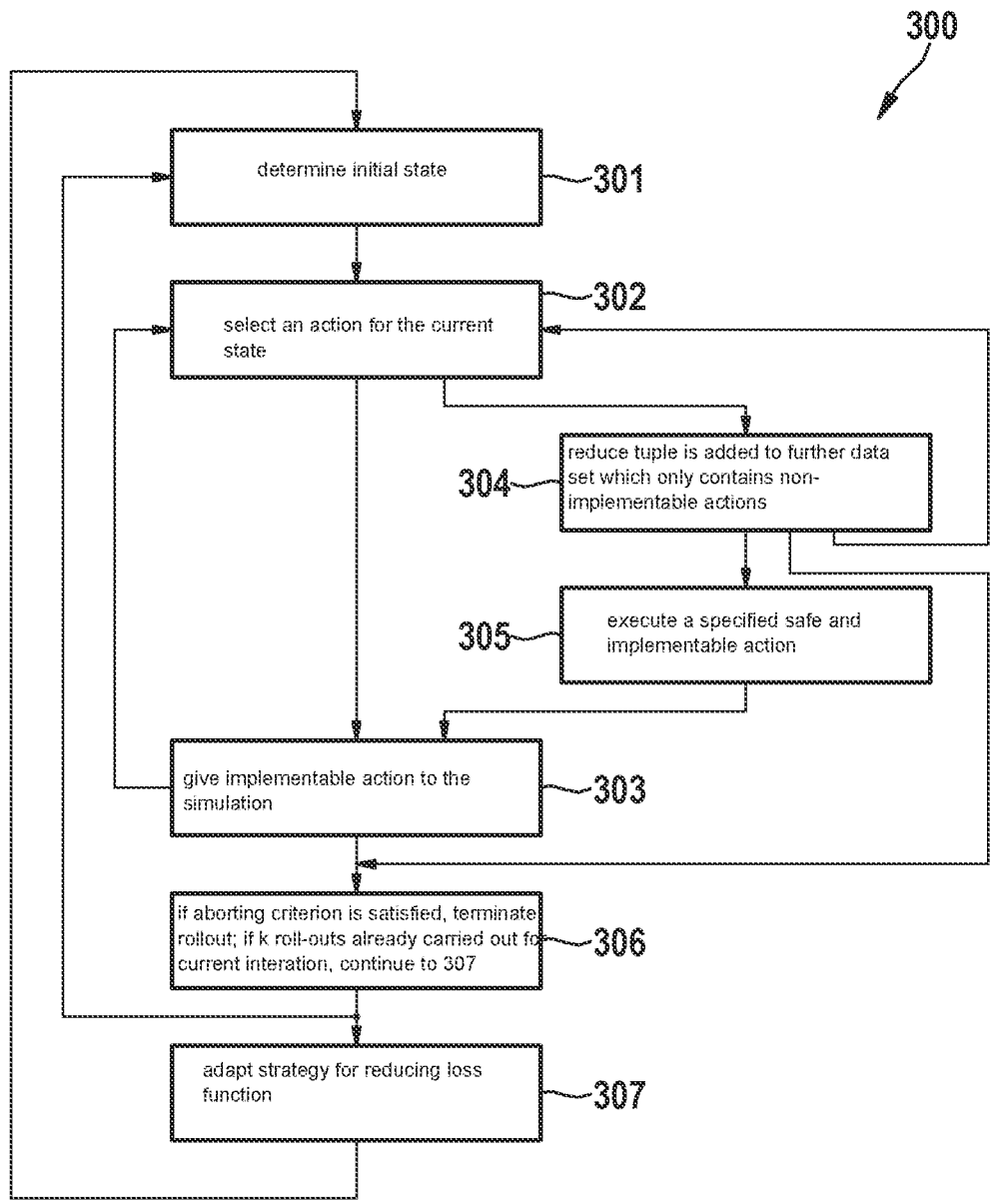
FIG. 3 shows a flow chart 300, which illustrates a training method according to one specific example embodiment of the present invention.

FIG. 3 shows a flow chart 300, which illustrates a training method according to one specific embodiment.

A strategy $\Pi_\theta(a|s)$ is trained iteratively; in each iteration, a training increment (e.g., an adjustment of weighting for a neural network, which implements the strategy) being ascertained. In each iteration, a quantity of k roll-outs being carried out by an exploration strategy. The exploration strategy may be the same as current strategy $\Pi_\theta(a|s)$ (that is, the version of the strategy to be improved in the current iteration) or a strategy $\Pi'_\theta(a|s)$ derived from the current strategy by modification. For example, strategy $\Pi'_\theta(a|s)$ is modified in comparison with strategy $\Pi_\theta(a|s)$ to the effect that in each state, a random action having a particular probability may be selected.

For each roll-out, in 301, an initial state s is first determined for the simulation.

In 302, an action a corresponding to strategy $\Pi_\theta(a|s)$ or modified strategy $\Pi'_\theta(a|s)$ is selected for current state s (e.g., randomly in accordance with probabilities given by the exploration strategy). An Oracle Os(a) determines if the selected action is implementable:

Os(a)=1⇔a is an element of A'(s)

Os(a)=0⇔a is not an element of A'(s).

If the selected action is implementable, then the method continues with 303.

If the action is not implementable, then, in 304, the reduced tuple (a, s) is added to a further data set $D_v=\{(a, s)\}$, which only contains the non-implementable actions.

Subsequently:
1. In the case of m actions that are already selected, but not implementable, then, in 305, a specified, safe and implementable (restoring) action a' is executed, if available. In this connection, value m is a parameter of the training method. The restoring action may be one of several actions, which is safe always (or at least in most cases).
2. In the case of n actions that are already selected, but not implementable, the roll-out is terminated in 306. In this connection, value n is a parameter of the training method. For example, n=m+1. For example, n=m+1, with m=4.
3. Otherwise, the method returns to 302, that is, an action is selected once more in accordance with the exploration strategy.

In 303, selected, implementable action a is given to the simulation, which outputs reward r and following state s'. State s, selected action a, and the corresponding reward, as well as subsequent state s', are added to data set D as a tuple (s, a, r, s').

If an aborting criterion is satisfied (e.g., the control target is reached or a maximum number of states are attained, the roll-out is terminated in 306. Otherwise, the flow chart returns to 302, having state s' as a following, current state.

If the roll-out is terminated in 306, and if k roll-outs have already been carried out for the current iteration, then the method is continued at 307.

If the roll-out is terminated in 306, and if k roll-outs have still not been carried out for the current iteration, then the flow chart returns to 301 for a further roll-out.

In 307, the strategy is adapted by reducing a loss function $L_E(\Pi_\theta, D_v)=L(\Pi_\theta,D)+\lambda*L_H(\Pi_\theta, D, D_v)$ expanded in a manner specific to the method. In this connection, $L(\Pi_\theta, D)$ is the original, specific loss function of the underlying reinforcement learning method, e.g., of an actor-critic RL method or a deep Q-learning method, as described above.

$L_H(\Pi_\theta, D_v)$ is an auxilary loss function, and $\lambda$ is a parameter of the training method. This auxiliary loss function is specified in such a manner, that its minimization is equivalent to the prevention of non-implementable actions by the strategy. For example, auxiliary loss function $L_H(\Pi_\theta, D_v)$ is given by
1. $\Sigma_{(s, a, ., .)\in D} \log \Pi_\theta(a|s)+\Sigma_{(s, a)\in D_v} \log(\pi_\theta(a|s))$ for an actor-critic RL method.
2. $\Sigma_{(s, a, ., .)\in D} Q_\theta(s, a)+\Sigma_{(s, a)\in D_v} Q_\theta(s, a)$ for a deep Q-learning RL method;

After the strategy is adapted in 307, the method is continued with the next iteration (using the adapted strategy).

As an embodiment variant of the training method, 305 (and the corresponding check as to whether a restoring action is available) may be omitted (e.g., if in a specific application, in which a safe restoring action is generally or mostly not available).

According to one embodiment variant, the limit m or n of selected, but non-implementable actions used in 304 is reduced over the training, e.g., in accordance with $m=\max m*(1-\text{current iteration number/maximum number of interations})$ and/or $n=\max n*(1-\text{current iteration number/maximum number of interations})$;

where max m, max n are initial values.

According to one embodiment variant, the used in 307 is reduced over the training, e.g., $\lambda=\max \lambda*(1-\text{current iteration number/maximum number of iterations})$.

The above-mentioned embodiment variants may be combined in any way desired.

The one oracle Os(a) may be defined by the RL user with the aid of domain knowledge of, e.g., traffic rules, vehicle dynamics, system limitations. It may be learned from data or determined by the simulation environment.

Figure 4:
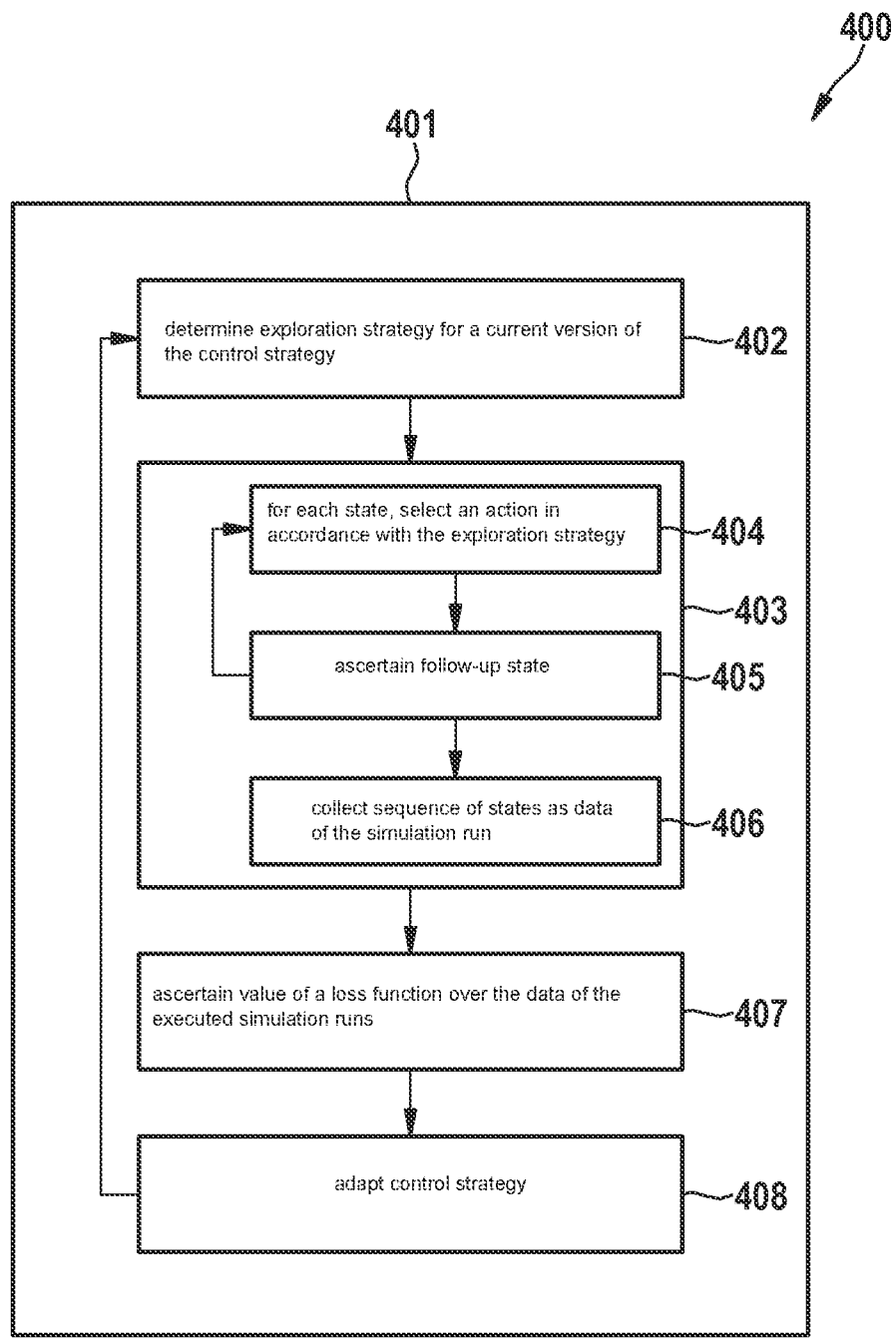
FIG. 4 shows a flow chart 400, which illustrates a method of training a control strategy for a control device.

In summary, according to different specific embodiments, a method is provided for training a control strategy for a control device (e.g., a robot control strategy for a robot control device, more generally, a software or hardware agent control strategy for a software or hardware agent), as represented in FIG. 4.

FIG. 4 shows a flow chart 400, which illustrates a method of training a control strategy for a control device.

The method is an iterative method, which performs iterations 401 up to an aborting criterion (e.g., loss function value below a threshold; maximum number of iterations reached).

In each iteration 401, an exploration strategy for a current version of the control strategy is determined in 402. This may match the control strategy or be derived from it by modification.

Several simulation runs 403 are then carried out for iteration 401; for each simulation run 403, in 404, for each state of a sequence of states beginning with an initial state of the simulation run, an action being selected in accordance with the exploration strategy, and it being checked if the selected action is safe, until a safe action has been selected or a maximum number of actions greater than or equal to two has been selected.

In 405, the follow-up state of the state in the sequence of states is ascertained by simulation during the execution of the selected action, if a safe action has been selected, or if no safe action has been selected up to the reaching of the maximum number in accordance with the strategy, the simulation run is interrupted or a specified, safe action (also referred to as a restoring or back-up action) is selected, if one like that is available, and the follow-up state of the state in the sequence of states is ascertained by simulation during the execution of the selected, specified, safe action.

In 406, the sequence of states, including the selected actions and rewards received in the states, are collected as data of the simulation run.

In 407, the value of a loss function over the data of the executed simulation runs is ascertained for the iteration, and in 408, the control strategy is adapted for a new version, so that the value of the loss function is reduced.

In other words, according to different specific embodiments, a method is provided, in order to learn a strategy, which takes into account complex sets of implementable actions. According to one specific embodiment, a training algorithm is provided, which trains a strategy (or a control algorithm) that, on the basis of any kind of input data, supplies actions as an output, which control a system (implemented in hardware and/or software).

A "safe" action may be understood to be an action, which is implementable in the sense that a predefined safety criterion is satisfied, e.g., that when it is implemented, the risk of damage or danger lies below a predefined threshold value. A predefined oracle (which implements, for example, such a safety criterion) may assess if an action is safe.

The control strategy is, for example, a robot control strategy. A "robot" may be understood as any physical system (e.g., having a mechanical part, whose movement is controlled), such as a computer-controlled machine, a vehicle, a household appliance, an electric power tool, a manufacturing machine, a personal assistant, or an access control system. The control strategy may also be a control system for an information transmission system, such as a monitoring system or a medical (e.g., imaging) system. Thus, according to different specific embodiments, a machine learning system may be trained for one of the above-mentioned systems.

A robot control strategy trained according to specific embodiments may be used by a robot control device for controlling a robot. According to the robot control strategy, the robot control device may select control actions in response to sensor data (potentially preprocessed, e.g., by image recognition or image classification). These may be sensor data of any type of sensor, which is capable of detecting data. The sensor may be, for example, an imaging sensor, such as a camera sensor or a video sensor, a remote position-finding sensor, such as a radar sensor, a lidar sensor or an ultrasonic sensor, or a thermal sensor, a speed sensor, an acceleration sensor, or an angular-position sensor.

Although the present invention has been set forth and described, above all, with reference to particular specific embodiments, it should be understood by those skilled in the art, that numerous modifications with regard to form and details may be made to it, without departing from the essence and field of the present invention. Thus, the present invention is intended to encompass all modifications, which fall under the lexical meaning or the equivalent field of the present invention.

What is claimed is:

1. A method for training a control strategy for a control device over several iterations, the method comprising, in each iteration:
    determining an exploration strategy for finding a safe action, for a current version of the control strategy;
    carrying out several simulation runs, including, for each of the simulation runs, performing:
        beginning with an initial state of the simulation run, selecting an action in accordance with the exploration strategy, and checking whether the selected action is safe, the selecting and the checking being performed until a safe action has been selected or until a maximum number of actions greater than or equal to two has been selected in accordance with the exploration strategy and checked as to whether the selected action are safe,
            (i) if a safe action has been selected, ascertaining a follow-up state of the state in the sequence of states by simulation during execution of the selected action,
            (ii) if no safe action has been selected up to reaching of the maximum number of actions in accordance with the exploration strategy: (a) interrupting the simulation run, or (b) selecting a specified, safe action, if a specified safe action is available in the state of the sequence of states and ascertaining the follow-up state of the state by simulation during execution of the selected, specified, safe action,
        wherein the initial state and the follow-up state form a sequence of states of the simulation run, and
        collecting the sequence of states, including the selected actions and rewards received in the states, as data of the simulation run;
    ascertaining a value of a loss function over the data of the executed simulation runs for the iteration; and
    adapting the control strategy to a new version, so that the value of the loss function is reduced;
    wherein, for at least one of the several simulation runs, several attempts are made to find a safe action in accordance with the exploration strategy by performing the selecting of an action in accordance with the exploration strategy and the checking as to whether the selected action is safe multiple times, up to the maximum number of actions greater than or equal to two being selected in accordance with the exploration strategy and checked as to whether the selected actions are safe, for the at least one of the several simulation runs; and
    wherein an action is safe when a risk of damage or danger to an agent that uses the control device lies below a predetermined threshold value.

2. The method as recited in claim 1, wherein the loss function includes an auxiliary term, which is a function of the data of the executed simulation runs, and which penalizes selection of actions in the simulation runs.

3. The method as recited in claim 2, wherein the auxiliary term is weighted, and beginning with a starting weight, the weighting is reduced in the course of the iterations.

4. The method as recited in claim 1, wherein the control strategy is given by a neural network, and the adaptation of the control strategy includes an adaptation of weightings of the neural network.

5. The method as recited in claim 1, wherein each simulation run is ended, when a number of states in the sequence of states reaches a maximum length, or when a control target is reached in the ascertained follow-up state.

6. The method as recited in claim 1, wherein the loss function is a loss function for an actor-critic RL method or a deep Q-learning method.

7. The method as recited in claim 1, wherein beginning with a predetermined initial value for the maximum number of actions, the maximum number of actions is reduced in the course of the iterations.

8. A device configured to train a control strategy for a control device over several iterations, the device configured to, in each iteration:
- determine an exploration strategy for a current version of the control strategy;
- carry out several simulation runs, and for each of the simulation runs, the device is configured to:
  - beginning with an initial state of the simulation run, select an action in accordance with the exploration strategy, and check whether the selected action is safe, the selecting and the checking being performed until a safe action has been selected or until a maximum number of actions greater than or equal to two has been selected in accordance with the exploration strategy and checked as to whether the selected actions are safe,
  - (i) if a safe action has been selected, ascertain a follow-up state of the state in the sequence of states by simulation during execution of the selected action,
  - (ii) if no safe action has been selected up to reaching of the maximum number of actions in accordance with the exploration strategy: (a) interrupt the simulation run, or (b) select a specified, safe action, if a specified safe action is available in the state of the sequence of states and ascertain the follow-up state of the state by simulation during execution of the selected, specified, safe action,
  - wherein the initial state and the follow-up date form a sequence of states of the simulation run, and
  - collect the sequence of states, including the selected actions and rewards received in the states, as data of the simulation run;
- ascertain a value of a loss function over the data of the executed simulation runs for the iteration; and
- adapt the control strategy to a new version, so that the value of the loss function is reduced;
- wherein, for at least one of the several simulation runs, several attempts are made to find a safe action in accordance with the exploration strategy by performing the selecting of an action in accordance with the exploration strategy and the checking as to whether the selected action is safe multiple times, up to the maximum number of actions greater than or equal to two being selected in accordance with the exploration strategy and checked as to whether the selected actions are safe, for the at least one of the several simulation runs;
- wherein an action is safe when a risk of damage or danger to an agent that uses the control device lies below a predetermined threshold value.

9. A control method, comprising:
- training a control strategy for a control device over several iterations, including, in each iteration:
  - determining an exploration strategy for a current version of the control strategy;
  - carrying out several simulation runs, including, for each of the simulation runs, performing:
    - beginning with an initial state of the simulation run, selecting an action in accordance with the exploration strategy, and checking whether the selected action is safe, the selecting and the checking being performed until a safe action has been selected or until a maximum number of actions greater than or equal to two has been selected in accordance with the exploration strategy and checked as to whether the selected actions are safe,
    - (i) if a safe action has been selected, ascertaining a follow-up state of the state in the sequence of states by simulation during execution of the selected action,
    - (ii) if no safe action has been selected up to reaching of the maximum number of actions in accordance with the exploration strategy: (a) interrupting the simulation run, or (b) selecting a specified, safe action, if a specified safe action is available in the state of the sequence of states and ascertaining the follow-up state of the state by simulation during execution of the selected, specified, safe action,
    - wherein the initial state and the follow-up state form a sequence of states of the simulation run, and
    - collecting the sequence of states, including the selected actions and rewards received in the states, as data of the simulation run;
  - ascertaining a value of a loss function over the data of the executed simulation runs for the iteration; and
  - adapting the control strategy to a new version, so that the value of the loss function is reduced;
- wherein, for at least one of the several simulation runs, several attempts are made to find a safe action in accordance with the exploration strategy by performing the selecting of an action in accordance with the exploration strategy and the checking as to whether the selected action is safe multiple times, up to the maximum number of actions greater than or equal to two being selected in accordance with the exploration strategy and checked as to whether the selected actions are safe, for the at least one of the several simulation runs; and
- wherein an action is safe when a risk of damage or danger to an agent that uses the control device lies below a predetermined threshold value; and
- controlling a software or hardware agent based on the trained control strategy.

10. A software or hardware agent, comprising:
- a sensor configured to provide sensor data; and
- a control device configured to control components of the software or hardware agent based on a trained control strategy, the control strategy being trained over several iterations, in each iteration:
  - an exploration strategy is determined for a current version of the control strategy;
  - several simulation runs are carried out, for each of the simulation runs:
    - beginning with an initial state of the simulation run, an action is selected in accordance with the exploration strategy, and it is checked whether the selected action is safe, the selecting and the checking being performed until a safe action has been selected or a maximum number of actions greater than or equal to two has been selected in accordance with the exploration strategy and checked as to whether the selected actions are safe,
    - (i) if a safe action has been selected, a follow-up state of the state in the sequence of states is ascertained by simulation during execution of the selected action,
    - (ii) if no safe action has been selected up to reaching the maximum number of actions in accordance with the exploration strategy: (a) the simulation run is interrupted, or (b) a specified, safe action is selected, if a specified safe action is available in the state of the sequence of states and the follow-up state of the state is ascertained by simulation during the execution of the selected, specified, safe action, wherein the initial state and the follow-up state form a sequence of states of the simulation run, and the sequence of states is collected, including the selected actions and rewards received in the states, as data of the simulation run;

a value of a loss function over the data of the executed simulation runs for the iteration is ascertained; and the control strategy is adapted to a new version, so that the value of the loss function is reduced;

wherein, for at least one of the several simulation runs, several attempts are made to find a safe action in accordance with the exploration strategy by performing the selecting of an action in accordance with the exploration strategy and the checking as to whether the selected action is safe multiple times, up to the maximum number of actions greater than or equal to two being selected in accordance with the exploration strategy and checked as to whether the selected actions are safe, for the at least one of the several simulation runs; and wherein an action is safe when a risk of damage or danger to the agent lies below a predetermined threshold value.

11. The software or hardware agent as recited in claim 10, wherein the software or hardware agent is a robot.

12. The software or hardware agent as recited in claim 10, further comprising:

at least one actuator;

wherein the control device is configured to control the at least one actuator in accordance with the trained control strategy.

13. A non-transitory computer-readable storage medium on which is stored a computer program for training a control strategy for a control device over several iterations, the computer program, when executed by one or more processors, causing the one or more processors to perform, in each iteration:

determining an exploration strategy for finding a safe state, for a current version of the control strategy;

carrying out several simulation runs, including, for each of the simulation runs, performing:

beginning with an initial state of the simulation run, selecting an action in accordance with the exploration strategy, and checking whether the selected action is safe, the selecting and the checking being performed until a safe action has been selected or until a maximum number of actions greater than or equal to two has been selected in accordance with the exploration strategy and checked as to whether the selected actions are safe, (i) if a safe action has been selected, ascertaining a follow-up state of the state in the sequence of states by simulation during execution of the selected action, (ii) if no safe action has been selected up to reaching of the maximum number of actions in accordance with the exploration strategy: (a) interrupting the simulation run, or (b) selecting a specified, safe action, if a specified safe action is available in the state of the sequence of states and ascertaining the follow-up state of the state by simulation during execution of the selected, specified, safe action, wherein the initial state and the follow-up state form a sequence of states of the simulation run, and collecting the sequence of states, including the selected actions and rewards received in the states, as data of the simulation run;

ascertaining a value of a loss function over the data of the executed simulation runs for the iteration; and adapting the control strategy to a new version, so that the value of the loss function is reduced;

wherein, for at least one of the several simulation runs, several attempts are made to find a safe action in accordance with the exploration strategy by performing the selecting of an action in accordance with the exploration strategy and the checking as to whether the selected action is safe multiple times, up to the maximum number of actions greater than or equal to two being selected in accordance with the selected action and checked as to whether the selected actions are safe, for the at least one of the several simulation runs; and wherein an action is safe when a risk of damage or danger to an agent that uses the control device lies below a predetermined threshold value.

\* \* \* \* \*